United States Patent
Shiono

(10) Patent No.: US 11,639,408 B2
(45) Date of Patent: May 2, 2023

(54) NITRILE GROUP-CONTAINING COPOLYMER RUBBER

(71) Applicant: ZEON CORPORATION, Tokyo (JP)

(72) Inventor: Atsuhiro Shiono, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 17/592,755

(22) Filed: Feb. 4, 2022

(65) Prior Publication Data

US 2022/0153898 A1    May 19, 2022

Related U.S. Application Data

(62) Division of application No. 16/493,270, filed as application No. PCT/JP2018/006684 on Feb. 23, 2018, now abandoned.

(30) Foreign Application Priority Data

Mar. 17, 2017 (JP) .............. JP2017-052607

(51) Int. Cl.
*C08F 236/14* (2006.01)
*C08C 19/22* (2006.01)

(52) U.S. Cl.
CPC ........... *C08F 236/14* (2013.01); *C08C 19/22* (2013.01)

(58) Field of Classification Search
CPC ......... C08C 19/02; C08C 3/00; C08F 220/44; C08F 236/14; C08F 236/12
See application file for complete search history.

(56) References Cited

U.S. PATENT DOCUMENTS

| | | | |
|---|---|---|---|
| 5,651,995 A * | 7/1997 | Oyama | ............ C08L 15/005 524/565 |
| 6,657,014 B1 | 12/2003 | Mori et al. | |
| 2007/0037930 A1 | 2/2007 | Odagawa et al. | |
| 2009/0186977 A1* | 7/2009 | Nagamori | ............ C08K 3/36 524/556 |
| 2010/0179277 A1 | 7/2010 | Soddemann et al. | |

(Continued)

FOREIGN PATENT DOCUMENTS

| | | | |
|---|---|---|---|
| JP | 2001-055471 A | | 2/2001 |
| JP | 2009179686 | * | 8/2009 |

(Continued)

OTHER PUBLICATIONS

Translation of JP 2009-179686 (Year: 2009).*

(Continued)

*Primary Examiner* — Robert C Boyle
(74) *Attorney, Agent, or Firm* — Oliff PLC

(57) ABSTRACT

A nitrile group-containing copolymer rubber including 10 to 60 wt % of an α,β-ethylenically unsaturated nitrile monomer unit and 1 to 60 wt % of an α,β-ethylenically unsaturated dicarboxylic acid monoester monomer unit, and having an iodine value of 120 or less, wherein a processability index Ipro (Ipro=CC×SA) is 0.0030 or less, where the processability index Ipro is the product of the carboxyl group content CC, which is the number of moles of carboxyl (Continued)

groups per 100 g of nitrile group-containing copolymer rubber, and the absorbance area SA of a carboxylic anhydride group determined by infrared spectroscopy.

8 Claims, 1 Drawing Sheet

(56) References Cited

U.S. PATENT DOCUMENTS

| | | | |
|---|---|---|---|
| 2010/0256294 A1* | 10/2010 | Ikeda | C08K 5/18 525/379 |
| 2012/0214945 A1 | 8/2012 | Emori | |
| 2015/0246991 A1 | 9/2015 | Mori | |
| 2017/0226254 A1 | 8/2017 | Mori | |

FOREIGN PATENT DOCUMENTS

| | | |
|---|---|---|
| JP | 2010-144176 A | 7/2010 |
| JP | 2016-006132 A | 1/2016 |
| WO | 2005/030859 A1 | 4/2005 |
| WO | 2016/052335 A1 | 4/2016 |

OTHER PUBLICATIONS

Apr. 24, 2018 International Search Report issued in International Patent Application No. PCT/JP2018/006684.
Sep. 17, 2019 International Preliminary Report on Patentability issued in International Patent Application No. PCT/JP2018/006684.
Dec. 12, 2020 Extended European Search Report issued in European Application No. 18766827.2.
Dec. 28, 2020 Office Action issued in Russian Application No. 2019128492/04.
Mar. 19, 2021 Office Action issued in Indian Application No. 201917036429.
Oct. 28, 2021 Hearing Notice issued in Indian Patent Application No. 201917036429.
Jul. 19, 2022 Office Action issued in Brazilian Application No. BR112019019066-0.
Oct. 25, 2022 Office Action issued in Brazilian Application No. BR112019019066-0.
Feb. 14, 2023 Office Action issued in Brazil Patent Application BR112019019066-0.

\* cited by examiner

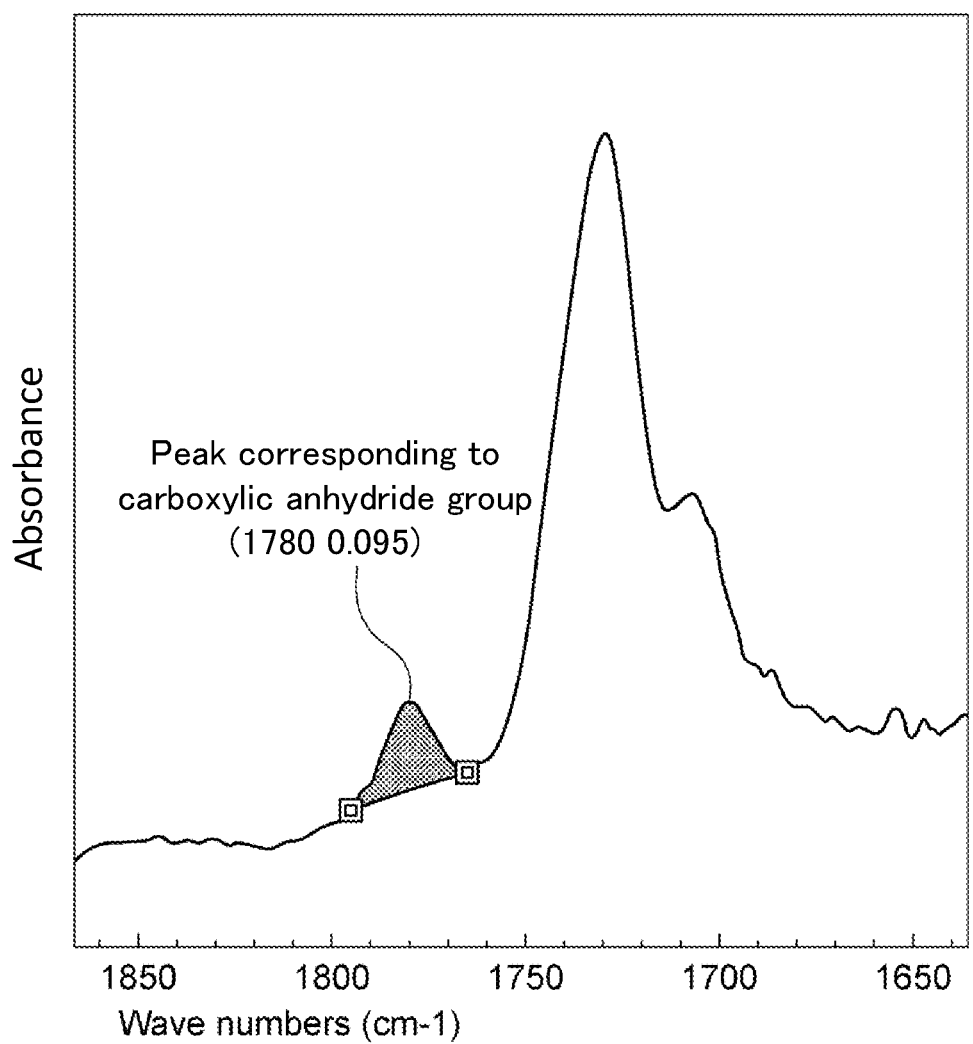

NITRILE GROUP-CONTAINING COPOLYMER RUBBER

CROSS REFERENCE TO RELATED APPLICATION

This application is a divisional application of U.S. application Ser. No. 16/493,270, filed Sep. 11, 2019, the contents of which are incorporated herein by reference.

TECHNICAL FIELD

The present invention relates to a nitrile group-containing copolymer rubber, and more specifically relates to a nitrile group-containing copolymer rubber which has high processability, and can give a cross-linked rubber having high compression set resistance when made into a cross-linked rubber.

BACKGROUND ART

Nitrile rubber (acrylonitrile-butadiene copolymer rubber), because of its useful oil resistance, mechanical properties, resistance against chemicals, is conventionally used as a material for rubber parts such as hoses and seals for automobiles. Moreover, hydrogenated nitrile rubber (hydrogenated acrylonitrile-butadiene copolymer rubber) obtained through hydrogenation of carbon-carbon double bonds in the polymer main chain of nitrile rubber has higher mechanical properties and heat resistance, and is used for rubber parts such as belts, hoses, seals, diaphragms, and the like.

As a composition of such a nitrile rubber, for example, Patent Document 1 proposes a nitrile rubber composition comprising a hydrogenated nitrile rubber including an $\alpha,\beta$-ethylenically unsaturated dicarboxylic acid monoester monomer unit, a polyamine cross-linking agent, and a basic cross-linking accelerator. Although the nitrile rubber composition according to Patent Document 1 provides a cross-linked rubber having an improved compression set resistance, a significant increase in viscosity occurs when the polyamine cross-linking agent is compounded, leading to insufficient processability. For this reason, a further improvement in processability has been desired.

RELATED ART DOCUMENTS

Patent Document

Patent Document 1: JP-A 2001-55471

SUMMARY OF THE INVENTION

Problem to be Solved by the Invention

The present invention has been made in consideration of such circumstances. An object of the present invention is to provide a nitrile group-containing copolymer rubber which has high processability and can give a cross-linked rubber having high compression set resistance when made into a cross-linked rubber.

Means for Solving Problems

The present inventors, who have conducted extensive research to achieve the object above, have found that the object can be achieved by a nitrile group-containing copolymer rubber comprising an $\alpha,\beta$-ethylenically unsaturated nitrile monomer unit and an $\alpha,\beta$-ethylenically unsaturated dicarboxylic acid monoester monomer unit in specific amounts and having an iodine value of 120 or less, in which a processability index, which is the product of the carboxyl group content and the absorbance area of a carboxylic anhydride group determined by infrared spectroscopy, is controlled within a predetermined range, and have completed the present invention.

In other words, the present invention provides a nitrile group-containing copolymer rubber comprising 10 to 60 wt % of an $\alpha,\beta$-ethylenically unsaturated nitrile monomer unit and 1 to 20 wt % of an $\alpha,\beta$-ethylenically unsaturated dicarboxylic acid monoester monomer unit and having an iodine value of 120 or less, wherein a processability index $I_{pro}$ ($I_{pro}=C_C \times S_A$) is 0.0030 or less, where the processability index $I_{pro}$ is the product of the carboxyl group content $C_C$, which is the number of moles of carboxyl groups per 100 g of nitrile group-containing copolymer rubber, and the absorbance area $S_A$ of a carboxylic anhydride group determined by infrared spectroscopy.

The nitrile group-containing copolymer rubber according to the present invention preferably contains a conjugated diene monomer unit in an amount of 20 to 89 wt %.

In the nitrile group-containing copolymer rubber according to the present invention, a content of the $\alpha,\beta$-ethylenically unsaturated dicarboxylic acid monoester monomer unit is preferably 1 to 10 wt %.

In the nitrile group-containing copolymer rubber according to the present invention, the $\alpha,\beta$-ethylenically unsaturated dicarboxylic acid monoester monomer unit is preferably at least one selected from the group consisting of a mono-n-butyl maleate unit, a mono-n-butyl fumarate unit, and a monocyclohexyl fumarate unit.

The present invention also provides a cross-linkable rubber composition comprising the nitrile group-containing copolymer rubber and a cross-linking agent.

The cross-linkable rubber composition according to the present invention preferably further comprises a basic cross-linking accelerator having a cyclic amidine structure.

Furthermore, the present invention provides a cross-linked rubber prepared through cross-linking of the cross-linkable rubber composition.

Effects of Invention

The present invention can provide a nitrile group-containing copolymer rubber which has high processability and can give a cross-linked rubber having high compression set resistance when made into a cross-linked rubber, and a cross-linked rubber which can be prepared using such a nitrile group-containing copolymer rubber and has high compression set resistance.

BRIEF DESCRIPTION OF DRAWINGS

FIG. 1 is a diagram illustrating a spectrum obtained by infrared spectroscopy of the nitrile group-containing copolymer rubber according to Production Example 11.

DESCRIPTION OF EMBODIMENTS

Nitrile Group-Containing Copolymer Rubber

The nitrile group-containing copolymer rubber according to the present invention is a nitrile group-containing copolymer rubber comprising 10 to 60 wt % of an $\alpha,\beta$-ethylenically unsaturated nitrile monomer unit and 1 to 60 wt % of an α,β-ethylenically unsaturated dicarboxylic acid monoester monomer unit and having an iodine value of 120 or less, wherein a processability index $I_{pro}$ ($I_{pro}=C_C \times S_A$) is controlled to 0.0030 or less where the processability index is the product of the carboxyl group content $C_C$, which is the number of moles of carboxyl groups per 100 g of nitrile group-containing copolymer rubber, and the absorbance area $S_A$ of a carboxylic anhydride group determined by infrared spectroscopy.

Any α,β-ethylenically unsaturated compound having a nitrile group can be used as the α,β-ethylenically unsaturated nitrile monomer forming the α,β-ethylenically unsaturated nitrile monomer unit without limitation. Examples thereof include acrylonitrile; α-halogenoacrylonitriles such as α-chloroacrylonitrile and α-bromoacrylonitrile; α-alkylacrylonitriles such as methacrylonitrile and ethacrylonitrile; and the like. Among these, preferred are acrylonitrile and methacrylonitrile, and particularly preferred is acrylonitrile. These α,β-ethylenically unsaturated nitrile monomers may be used alone or in combination.

The proportion of the α,β-ethylenically unsaturated nitrile monomer unit contained in the nitrile group-containing copolymer rubber according to the present invention is 10 to 60 wt %, preferably 10 to 50 wt %, more preferably 15 to 45 wt % of the total monomer units. An excessively low proportion of the α,β-ethylenically unsaturated nitrile monomer unit results in a cross-linked rubber having reduced oil resistance. In contrast, an excessively high proportion thereof results in a cross-linked rubber having reduced cold resistance.

Examples of α,β-ethylenically unsaturated dicarboxylic acid monoester monomers forming the α,β-ethylenically unsaturated dicarboxylic acid monoester monomer unit include maleic acid monoalkyl esters such as monomethyl maleate, monoethyl maleate, monopropyl maleate, and mono-n-butyl maleate; maleic acid monocycloalkyl esters such as monocyclopentyl maleate, monocyclohexyl maleate, and monocycloheptyl maleate; maleic acid monoalkylcycloalkyl esters such as monomethylcyclopentyl maleate and monoethylcyclohexyl maleate; fumaric acid monoalkyl esters such as monomethyl fumarate, monoethyl fumarate, monopropyl fumarate, and mono-n-butyl fumarate; fumaric acid monocycloalkyl esters such as monocyclopentyl fumarate, monocyclohexyl fumarate, and monocycloheptyl fumarate; fumaric acid monoalkylcycloalkyl esters such as monomethylcyclopentyl fumarate and monoethylcyclohexyl fumarate; citraconic acid monoalkyl esters such as monomethyl citraconate, monoethyl citraconate, monopropyl citraconate, and mono-n-butyl citraconate; citraconic acid monocycloalkyl esters such as monocyclopentyl citraconate, monocyclohexyl citraconate, and monocycloheptyl citraconate; citraconic acid monoalkylcycloalkyl esters such as monomethylcyclopentyl citraconate and monoethylcyclohexyl citraconate; itaconic acid monoalkyl esters such as monomethyl itaconate, monoethyl itaconate, monopropyl itaconate, and mono-n-butyl itaconate; itaconic acid monocycloalkyl esters such as monocyclopentyl itaconate, monocyclohexyl itaconate, and monocycloheptyl itaconate; itaconic acid monoalkylcycloalkyl esters such as monomethylcyclopentyl itaconate and monoethylcyclohexyl itaconate; and the like.

These α,β-ethylenically unsaturated dicarboxylic acid monoester monomers may be used alone or in combination. Among these, more preferred are α,β-ethylenically unsaturated dicarboxylic acid monoalkyl ester monomers and α,β-ethylenically unsaturated dicarboxylic acid monocycloalkyl ester monomers. Still more preferred are maleic acid monoalkyl esters, fumaric acid monoalkyl esters, fumaric acid monocycloalkyl esters, and itaconic acid monoalkyl esters. Particularly preferred are mono-n-butyl maleate, mono-n-butyl fumarate, and monocyclohexyl fumarate. These alkyl esters preferably have $C_2$ to $C_8$ alkyl groups.

The proportion of the α,β-ethylenically unsaturated dicarboxylic acid monoester monomer unit contained in the nitrile group-containing copolymer rubber according to the present invention is 1 to 60 wt %, preferably 1 to 20 wt %, more preferably 1 to 10 wt %, still more preferably 3 to 8 wt % of the total monomer units. An excessively low proportion of the α,β-ethylenically unsaturated dicarboxylic acid monoester monomer unit results in a cross-linked rubber having reduced compression set resistance. In contrast, an excessively high proportion thereof results in a reduction in elongation of the resulting cross-linked rubber, the elongation being one of the mechanical properties.

It is preferred that the nitrile group-containing copolymer rubber according to the present invention also contains a conjugated diene monomer unit to provide a cross-linked product having rubber elasticity.

Preferred conjugated diene monomers forming the conjugated diene monomer unit are $C_4$ to $C_6$ conjugated diene monomers such as 1,3-butadiene, isoprene, 2,3-dimethyl-1,3-butadiene, 1,3-pentadiene, and chloroprene. 1,3-Butadiene and isoprene are more preferred, and 1,3-butadiene is particularly preferred. These conjugated diene monomers may be used alone or in combination.

The content of the conjugated diene monomer unit (including hydrogenated moieties) is preferably 20 to 89 wt %, more preferably 30 to 80 wt %, still more preferably 40 to 65 wt % of the total monomer units. A content of the conjugated diene monomer unit within this range results in a cross-linked rubber maintaining favorable heat resistance and chemical stability and having excellent rubber elasticity. In addition, a content of the conjugated diene monomer unit controlled to the lower limit value or higher can improve the polymerization conversion ratio.

To provide a cross-linked rubber having excellent low temperature properties, it is preferred that the nitrile group-containing copolymer rubber according to the present invention also contains an α,β-ethylenically unsaturated monocarboxylic acid ester monomer unit when 30 wt % or less of the α,β-ethylenically unsaturated nitrile monomer unit is contained.

Examples of α,β-ethylenically unsaturated monocarboxylic acid ester monomers forming the α,β-ethylenically unsaturated monocarboxylic acid ester monomer unit include (meth)acrylic acid esters (abbreviation for "methacrylic acid esters and acrylate esters" and the same applies hereinafter) having $C_1$ to $C_{18}$ alkyl groups, such as methyl acrylate, ethyl acrylate, n-butyl acrylate, isobutyl acrylate, n-dodecyl acrylate, methyl methacrylate, and ethyl methacrylate; (meth)acrylic acid esters having $C_2$ to $C_{18}$ alkoxyalkyl groups, such as methoxymethyl acrylate, methoxyethyl acrylate, ethoxypropyl acrylate, methoxybutyl acrylate, ethoxydodecyl acrylate, methoxyethyl methacrylate, methoxybutyl methacrylate, and ethoxypentyl methacrylate; (meth)acrylic acid esters having $C_2$ to $C_{12}$ cyanoalkyl groups, such as α-cyanoethyl acrylate, α-cyanoethyl methacrylate, and cyanobutyl methacrylate; (meth)acrylic acid esters having $C_1$ to $C_{12}$ hydroxyalkyl groups, such as 2-hydroxyethyl acrylate, 2-hydroxypropyl acrylate, and 2-hydroxyethyl methacrylate; (meth)acrylic acid esters having $C_1$ to $C_{12}$ fluoroalkyl groups, such as trifluoroethyl acrylate and tetrafluoropropyl methacrylate; and the like.

Among these, preferred are (meth)acrylic acid esters having $C_1$ to $C_{18}$ alkyl groups and (meth)acrylic acid esters having $C_2$ to $C_{18}$ alkoxyalkyl groups, and particularly preferred are n-butyl acrylate and methoxyethyl acrylate to provide a cross-linked rubber having further enhanced cold resistance. These α,β-ethylenically unsaturated monocarboxylic acid ester monomers may be used alone or in combination.

The proportion of the α,β-ethylenically unsaturated monocarboxylic acid ester monomer unit in the nitrile group-containing copolymer rubber according to the present invention is preferably 0 to 60 wt %, more preferably 0 to 50 wt %, still more preferably 0 to 40 wt % of the total monomer units. By controlling the proportion of the α,β-ethylenically unsaturated monocarboxylic acid ester monomer unit within this range, a cross-linked rubber having favorable oil resistance and further enhanced cold resistance can be obtained. In addition, a reduction in polymerization conversion ratio and a reduction in strength as one of the mechanical properties of the resulting cross-linked rubber caused by an excessively large content of the α,β-ethylenically unsaturated monocarboxylic acid ester monomer unit can be prevented.

In addition to the α,β-ethylenically unsaturated nitrile monomer unit, the α,β-ethylenically unsaturated dicarboxylic acid monoester monomer unit, and the conjugated diene monomer unit and the α,β-ethylenically unsaturated monocarboxylic acid ester monomer unit both of which can be added as needed, the nitrile group-containing copolymer rubber according to the present invention may also contain a unit of an additional monomer copolymerizable with the monomers which form these monomer units. Examples of such an additional monomer include α,β-ethylenically unsaturated monocarboxylic acid monomers, α,β-ethylenically unsaturated polyvalent carboxylic acid monomers (excluding those categorized under the α,β-ethylenically unsaturated dicarboxylic acid monoester monomer), ethylene, α-olefin monomers, aromatic vinyl monomers, fluorine-containing vinyl monomers, copolymerizable antioxidants, and the like.

Examples of the α,β-ethylenically unsaturated monocarboxylic acid monomers include acrylic acid, methacrylic acid, ethylacrylic acid, crotonic acid, cinnamic acid, and the like.

Examples of the α,β-ethylenically unsaturated polyvalent carboxylic acid monomers include butenedioic acids such as fumaric acid and maleic acid, itaconic acid, citraconic acid, mesaconic acid, glutaconic acid, allylmalonic acid, teraconic acid, and the like. Examples of anhydrides of α,β-unsaturated polyvalent carboxylic acids include maleic anhydride, itaconic anhydride, citraconic anhydride, and the like.

Preferred α-olefin monomers are those having 3 to 12 carbon atoms. Examples thereof include propylene, 1-butene, 4-methyl-1-pentene, 1-hexene, 1-octene, and the like.

Examples of the aromatic vinyl monomers include styrene, α-methylstyrene, vinylpyridine, and the like.

Examples of the fluorine-containing vinyl monomers include fluoroethyl vinyl ether, fluoropropyl vinyl ether, o-trifluoromethylstyrene, pentafluorovinyl benzoate, difluoroethylene, tetrafluoroethylene, and the like.

Examples of the copolymerizable antioxidants include N-(4-anilinophenyl) acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, and the like.

These additional copolymerizable monomers may be used in combination. The content of the unit of the additional monomer is preferably 50 wt % or less, more preferably 40 wt % or less, still more preferably 10 wt % or less of the total monomer units which form the nitrile group-containing copolymer rubber.

The nitrile group-containing copolymer rubber according to the present invention has an iodine value of 120 or less, preferably 60 or less, more preferably 50 or less, particularly preferably 30 or less. An excessively high iodine value of the nitrile group-containing copolymer rubber may result in a cross-linked rubber having reduced heat resistance and reduced ozone resistance.

In the nitrile group-containing copolymer rubber according to the present invention, the processability index $I_{pro}$ ($I_{pro}=C_C \times S_A$) is controlled to 0.0030 or less, where the processability index $I_{pro}$ is the product of the carboxyl group content $C_C$, which is the number of mole of carboxyl groups per 100 g of nitrile group-containing copolymer rubber, and the absorbance area $S_A$ of a carboxylic anhydride group determined by infrared spectroscopy. According to the present invention, by controlling the processability index $I_{pro}$ to 0.0030 or less, a processability of a nitrile group-containing copolymer rubber can be made excellent while making a compression set resistance of a cross-linked rubber excellent when made into a cross-linked rubber. In particular, according to the present invention, such control of the processability index $I_{pro}$ to 0.0030 or less can reduce an increase in Mooney viscosity, which is caused when the cross-linking agent is compounded. Thus, favorable forming properties can be provided when a variety of compounding agents including the cross-linking agent are compounded. The processability index $I_{pro}$ ($I_{pro}=C_C \times S_A$) is preferably 0.0025 or less, more preferably 0.0020 or less.

In particular, according to the knowledge of the present inventors, who have conducted extensive research about an improvement in processability when the cross-linking agent is compounded with the nitrile group-containing copolymer rubber containing the α,β-ethylenically unsaturated dicarboxylic acid monoester monomer unit, the present inventors have found that the processability is affected by the amount of free carboxyl groups contained in the nitrile group-containing copolymer rubber (the amount of free carboxyl groups which are not esterified and the like) and the amount of carboxylic anhydride groups (the amount of anhydrous carboxyl groups), and have completed the present invention.

The carboxyl group content $C_C$ is the number of moles of carboxyl groups per 100 g of nitrile group-containing copolymer rubber, and can be measured by the following method, for example. In other words, a nitrile group-containing copolymer rubber is dissolved in a predetermined solvent to prepare a solution of the nitrile group-containing copolymer rubber. The obtained solution is subjected to titration using an alkali, and the number of moles of carboxyl groups (the number of moles of free carboxyl groups which are not esterified and the like) per 100 g of rubber is calculated to determine the carboxyl group content $C_C$. The carboxyl group content $C_C$ is preferably 0.005 to 0.116 ephr, more preferably 0.005 to 0.058 ephr, particularly preferably 0.015 to 0.046 ephr. As the carboxyl group content $C_C$ increases, the processability index $I_{pro}$ also tends to increase. Opposed to this, the processability can be further enhanced by controlling the carboxyl group content $C_C$ to the upper limit value or lower. On the other hand, a cross-linked rubber having higher compression set resistance can be provided by controlling the carboxyl group content $C_C$ to the lower limit value or higher.

The absorbance area $S_A$ of a carboxylic anhydride group (anhydrous carboxyl group) determined by infrared spectroscopy is the area of the absorbance corresponding to the carboxylic anhydride group from infrared spectroscopy of the nitrile group-containing copolymer rubber. Although depending on the peak intensity, a peak corresponding to the carboxylic anhydride group usually appears in the range of 1765 to 1795 $cm^{-1}$. The spectrum obtained by infrared spectroscopy of the nitrile group-containing copolymer rubber according to Production Example 11 is shown in FIG. 1.

In the present invention, infrared spectroscopy measurement can be performed on a solid nitrile group-containing copolymer rubber to measure absorbances at wavelengths by attenuated total reflection (ATR) method using a Fourier transform infrared spectrophotometer (FT-IR) as an infrared spectrophotometer according to "Analytical general rules for infrared spectroscopy" specified in JIS K 0117:2000. From the absorbances obtained by infrared spectroscopy, the area of the peak corresponding to the carboxylic anhydride group (peak which appears in the range of 1770 to 1790 $cm^{-1}$, and peak which appears in the range of 1765 to 1795 $cm^{-1}$ if the absorbance is relatively high) is determined, and can be defined as an absorbance area $S_A$.

The absorbance area $S_A$ is the area of the absorbance in the peak range corresponding to the carboxylic anhydride group (the peak range of 1770 to 1790 $cm^{-1}$, and the peak range of 1765 to 1795 $cm^{-1}$ if the absorbance is relatively high). The absorbance area $S_A$ is an integrated value of the absorbance (e.g., absorbance in the ordinate in the spectrum shown in FIG. 1) with respect to the wave number (e.g., wave number in the abscissa in the spectrum shown in FIG. 1). Specifically, a bottom line connecting the rise points of the peak corresponding to the carboxylic anhydride group is drawn, and the absorbance from the bottom line is integrated with respect to the wave number to determine the absorbance area $S_A$. The absorbance area $S_A$ can be determined using a standard measurement function included in a Fourier transform infrared spectrophotometer as the infrared spectrophotometer. If the absorbance area $S_A$ is measured using a diluted rubber sample (diluted with a highly transmissive material), the obtained absorbance value (measured value) is corrected according to the dilution proportion and the absorbance of the material used for dilution, and the absorbance area $S_A$ is calculated using the absorbance value after the correction.

The absorbance area $S_A$ is preferably 0.09 $cm^{-1}$ or less, more preferably 0.07 $cm^{-1}$ or less, still more preferably 0.06 $cm^{-1}$ or less. An excessively large absorbance area $S_A$ tends to increase the processability index $I_{pro}$. Opposed to this, the processability can be further enhanced through control thereof to the upper limit value specified above or lower.

In the present invention, the carboxyl group content $C_C$, the absorbance area $S_A$ of the carboxylic anhydride group determined by infrared spectroscopy, and the processability index $I_{pro}$, can be controlled within the ranges specified above by various methods. Examples thereof include a method of adjusting the content of the ethylenically unsaturated dicarboxylic acid monoester monomer unit in the nitrile group-containing copolymer rubber, a method of appropriately selecting the type of the ethylenically unsaturated dicarboxylic acid monoester monomer which forms the ethylenically unsaturated dicarboxylic acid monoester monomer unit, a method of controlling the thermal history of the nitrile group-containing copolymer rubber (such as a method of controlling the drying process, the drying temperature, and the drying time), a method using an appropriate combination thereof, and the like. In particular, the method of adjusting the content of the ethylenically unsaturated dicarboxylic acid monoester monomer unit or the method of controlling the thermal history of the nitrile group-containing copolymer rubber can effectively prevent generation of acid anhydrides derived from the ethylenically unsaturated dicarboxylic acid monoester monomer unit, thereby enabling an appropriate reduction in processability index $I_{pro}$.

The nitrile group-containing copolymer rubber according to the present invention has a polymer Mooney viscosity (ML1+4, 100° C.) of preferably 10 to 200, more preferably 15 to 100, still more preferably 20 to 80, particularly preferably 30 to 60. A polymer Mooney viscosity within this range results in favorable processability, as well as a crosslinked rubber having appropriately enhanced mechanical properties.

Although the nitrile group-containing copolymer rubber according to the present invention can be produced by any method, the nitrile group-containing copolymer rubber can be produced by copolymerizing the monomers described above, and hydrogenating the carbon-carbon double bonds of the resulting copolymer. Any polymerization method can be used without limitation, and a known emulsion polymerization or solution polymerization method may be used. Preferred is emulsion polymerization from the viewpoint of industrial productivity. In emulsion polymerization, polymerization additives usually used can be used in addition to an emulsifier, a polymerization initiator, and a molecular weight adjuster.

Any emulsifier can be used without limitation. Examples thereof include nonionic emulsifiers such as polyoxyethylene alkyl ethers, polyoxyethylene alkyl phenol ethers, polyoxyethylene alkyl esters, and polyoxyethylene sorbitan alkyl esters; anionic emulsifiers such as salts of fatty acids such as myristic acid, palmitic acid, oleic acid, and linolenic acid, salts of alkylbenzene sulfonates such as sodium dodecylbenzenesulfonate, polycondensates of naphthalene sulfonate salts with formalin, higher alcohol sulfuric acid ester salts, and alkyl sulfosuccinic acid salts; copolymerizable emulsifiers such as sulfo esters of α,β-unsaturated carboxylic acids, sulfate esters of α,β-unsaturated carboxylic acids, and sulfoalkylaryl ethers; and the like. The amount of the emulsifier to be added is preferably 0.1 to 10 parts by weight, more preferably 0.5 to 5 parts by weight relative to 100 parts by weight of the monomers used in polymerization.

Any radical initiator can be used as the polymerization initiator without limitation. Examples thereof include inorganic peroxides such as potassium persulfate, sodium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butylperoxy isobutyrate; azo compounds such as azobisisobutyronitrile, azobis-2,4-dimethylvaleronitrile, azobiscyclohexanecarbonitrile, and methyl azobisisobutyrate; and the like. These polymerization initiators can be used alone or in combination. Preferred polymerization initiators are inorganic or organic peroxides. If a peroxide is used as the polymerization initiator, a combination thereof with a reducing agent such as sodium bisulfite, ferrous sulfate, sodium formaldehyde sulfoxylate, or iron sodium ethylenediaminetetraacetate can be used as a redox polymerization initiator. Furthermore, a chelating agent such as ethylenediaminetetraacetic acid ferric sodium salt tetrahydrate, and a builder such as sodium carbonate or sodium sulfate can also be used. The amount of the polymerization initiator to be added is preferably 0.01 to 2 parts by weight relative to 100 parts by weight of the monomers used in polymerization.

Any molecular weight adjuster can be used without limitation. Examples thereof include mercaptans such as t-dodecyl mercaptan, n-dodecyl mercaptan, and octyl mercaptan; halogenated hydrocarbons such as carbon tetrachloride, methylene chloride, and methylene bromide; α-methylstyrene dimers; sulfur-containing compounds such as tetraethylthiuram disulfide, dipentamethylenethiuram disulfide, and diisopropyl xanthogen disulfide; and the like. These molecular weight adjusters can be used alone or in combination. Among these, preferred are mercaptans, and more preferred is t-dodecyl mercaptan. The amount of the molecular weight adjuster to be used is preferably 0.1 to 0.8 parts by weight relative to 100 parts by weight of the total monomers.

Water is usually used as the medium for emulsion polymerization. The amount of water is preferably 80 to 500 parts by weight, more preferably 80 to 300 parts by weight relative to 100 parts by weight of the monomers used in polymerization.

In emulsion polymerization, polymerization additives such as a stabilizer, a dispersant, a pH adjuster, an oxygen absorbing agent, and a particle size adjuster can be used as needed. The additives of any type can be used in any amount.

In the present invention, the resulting copolymer may be subjected to hydrogenation (hydrogenating reaction) as needed. Hydrogenation may be performed by a known method. Examples thereof include an oil layer hydrogenation method of coagulating a latex of a copolymer prepared through emulsion polymerization, and hydrogenating the latex in an oil layer; an aqueous layer hydrogenation method of hydrogenating a latex of the resulting copolymer as it is; and the like.

If hydrogenation is performed by the oil layer hydrogenation method, suitably, the latex of the above copolymer prepared by emulsion polymerization is subjected to coagulation by salting-out or with an alcohol, filtration, and drying, and then is dissolved in an organic solvent. In the next step, a hydrogenating reaction (oil layer hydrogenation) is performed, and the resulting hydride is added into a large amount of water, and is subjected to coagulation, washing with water, filtration, and drying. Thereby, the nitrile group-containing copolymer rubber according to the present invention can be prepared. In some cases, centrifugal dehydration may be performed.

The latex can be coagulated by salting-out using a known coagulant such as sodium chloride, calcium chloride, aluminum sulfate, magnesium sulfate, or the like. The coagulation may be performed using an alcohol such as methanol or isopropyl alcohol, instead of coagulation by salting-out. The solvent to be used in the oil layer hydrogenation method can be any liquid organic compound which dissolves a copolymer prepared through emulsion polymerization. Benzene, chlorobenzene, toluene, xylene, hexane, cyclohexane, tetrahydrofuran, methyl ethyl ketone, ethyl acetate, cyclohexanone, acetone, and the like are preferably used.

The catalyst to be used in the oil layer hydrogenation method can be any known selective hydrogenation catalyst. Preferred are palladium catalysts and rhodium catalysts, and more preferred are palladium catalysts (such as palladium acetate, palladium chloride, palladium hydroxide, and the like). These may be used in combination. In such a case, a palladium catalyst is preferably used as a main active component. These catalysts are usually used as carried on carriers. Examples of the carriers include silica, silica-alumina, alumina, diatomite, activated carbon, and the like. The amount of the catalyst to be used is preferably 10 to 20000 ppm by weight, more preferably 50 to 15000 ppm by weight relative to the copolymer.

Alternatively, if hydrogenation is performed by the aqueous layer hydrogenation method, suitably, a latex of the copolymer prepared through emulsion polymerization is diluted with water added, as needed, and is subjected to the hydrogenating reaction. Examples of the aqueous layer hydrogenation method include an aqueous layer direct hydrogenation method of performing hydrogenation through feeding of hydrogen to a reaction system in the presence of a hydrogenation catalyst, and an aqueous layer indirect hydrogenation method of performing hydrogenation through reduction in the presence of an oxidizing agent, a reducing agent, and an activating agent. Among these, preferred is an aqueous layer direct hydrogenation.

In the aqueous layer direct hydrogenation method, the content of the copolymer in the aqueous layer (content in the form of a latex) is preferably 40 wt % or less to prevent aggregation. The hydrogenation catalyst can be any compound which hardly decomposes in water. Specific examples thereof include palladium catalysts such as palladium salts of carboxylic acids such as formic acid, propionic acid, lauric acid, succinic acid, oleic acid, and phthalic acid; chlorinated palladium compounds such as palladium chloride, dichloro(cyclooctadiene)palladium, dichloro(norbonadiene)palladium, and ammonium hexachloropalladate(IV); iodides such as palladium iodide; palladium nitrate; palladium sulfate dihydrate; and the like. Among these, particularly preferred are palladium salts of carboxylic acids, palladium chloride, and palladium nitrate. The amount of the hydrogenation catalyst to be used may be appropriately determined. The amount is preferably 5 to 20000 ppm by weight, more preferably 10 to 15000 ppm by weight relative to the copolymer prepared through polymerization.

In the aqueous layer direct hydrogenation method, the hydrogenation catalyst in the latex is removed after the hydrogenating reaction is completed. This removal operation can be performed, for example, using a method comprising a step of adding an adsorbent such as an activated carbon or an ion exchange resin and adsorbing the hydrogenation catalyst under stirring or a step of forming a complex of the hydrogenation catalyst with a complexing agent in the presence of an oxidizing agent or a reducing agent, and then centrifuging and/or filtering the latex. The hydrogenation catalyst can be left in the latex, rather than removed.

In the aqueous layer direct hydrogenation method, the nitrile group-containing copolymer rubber according to the present invention can be produced by performing coagulation with an alcohol such as methanol and isopropyl alcohol or by salting-out, washing with water, and filtration on the resulting latex after the hydrogenating reaction, and drying the resulting hydrous crumbs. Coagulation by salting-out can be performed using a known coagulant such as sodium chloride, calcium chloride, aluminum sulfate, or magnesium sulfate. Centrifugal dehydration may be performed in some cases.

The oil layer hydrogenation method and the aqueous layer hydrogenation method both use hot air drying or kneading drying as the drying method. Alternatively, a method of performing coagulation, washing with water, and drying in a single kneader can also be used. To control the absorbance area $S_A$ of the carboxylic anhydride group determined by infrared spectroscopy and the processability index $I_{pro}$ within the ranges specified above, the drying temperature for hot air drying is preferably 40 to 100° C., more preferably 60 to 90° C. The drying time is preferably 0.5 to 12 hours, more preferably 1 to 6 hours. The drying temperature for kneading drying is preferably 100 to 200° C., more preferably 120 to 170° C. The drying time is preferably 1 to 20 minutes, more preferably 2 to 15 minutes. In both of the methods, a higher temperature or a longer drying time may increase the processability index $I_{pro}$ and reduce the processability. A lower temperature or a shorter drying time is likely to cause undried and wet spots.

An antioxidant can also be added to the oil layer or the aqueous layer before coagulation. Any antioxidant can be used without limitation. Examples of usable antioxidants include 2,6-di-t-butyl-4-cresol (ANTAGE BHT, made by Kawaguchi Chemical Industry Co., LTD.), 2,2'-methylenebis(4-methyl-6-tert-butylphenol) (Sandant 2246, made by Sanshin Chemical Industry Co., Ltd. industry), bis(3,5-di-tert-butyl-4-hydroxybenzyl)sulfide (Sandant 103, made by Sanshin Chemical Industry Co., Ltd.), pentaerythritol tetrakis[3-(3,5-di-tert-butyl-4-hydroxyphenyl)propionate] (Irganox 1010, made by BASF SE Japan Ltd.), octadecyl 3-(3,5-di-tert-butyl-4-hydroxyphenyl)propionate (Irganox 1076, made by BASF SE Japan Ltd.), isooctyl-3-(3,5-di-tert-butyl-4-hydroxyphenyl)propionate (Irganox 1135, made by BASF SE Japan Ltd.), hexamethylenebis[3-(3,5-di-tert-butyl-4-hydroxyphenyl)propionate] (Irganox 259, made by BASF SE Japan Ltd.), 4,6-bis(octylthiomethyl)-o-cresol (Irganox 1520L, made by BASF SE Japan Ltd.), and the like.

Cross-Linkable Rubber Composition

The cross-linkable rubber composition according to the present invention comprises the nitrile group-containing copolymer rubber according to the present invention and a cross-linking agent.

Any cross-linking agent which can cross-linking the nitrile group-containing copolymer rubber according to the present invention can be used without limitation. Examples thereof include sulfur cross-linking agents, organic peroxide cross-linking agents, and polyamine cross-linking agents. Among these, preferred are polyamine cross-linking agents.

Examples of the sulfur cross-linking agents include sulfur such as powdery sulfur, flowers of sulfur, precipitated sulfur, colloidal sulfur, surface-treated sulfur, and insoluble sulfur; sulfur-containing compounds such as sulfur chloride, sulfur dichloride, morpholine disulfide, alkylphenol disulfide, dibenzothiazyl disulfide, caprolactam disulfide (N,N'-dithiobis(hexahydro-2H-azepin-2-one)), phosphorus-containing polysulfide, and polymeric polysulfide; sulfur-donating compounds such as tetramethylthiuram disulfide, selenium dimethyldithiocarbamate, and 2-(4'-morpholinodithio)benzothiazole; and the like. These can be used alone or in combination.

Examples of the organic peroxide cross-linking agents include dicumyl peroxide, cumene hydroperoxide, t-butyl cumyl peroxide, paramenthane hydroperoxide, di-t-butyl peroxide, 1,3-bis(t-butylperoxyisopropyl)benzene, 1,4-bis(t-butylperoxyisopropyl)benzene, 1,1-di-t-butylperoxy-3,3-trimethylcyclohexane, 4,4-bis-(t-butyl-peroxy)-n-butyl valerate, 2,5-dimethyl-2,5-di-t-butylperoxyhexane, 2,5-dimethyl-2,5-di-t-butylperoxyhexyne-3,1,1-di-t-butylperoxy-3,5,5-trimethylcyclohexane, p-chlorobenzoyl peroxide, t-butylperoxyisopropyl carbonate, t-butylperoxy benzoate, and the like. These can be used alone or in combination.

The polyamine cross-linking agents may be any compound having two or more amino groups or any compound which is converted into a form having two or more amino groups during cross-linking. Preferred are compounds having an aliphatic hydrocarbon or aromatic hydrocarbon moiety with amino groups or hydrazide structures (the structures represented by —$CONHNH_2$ where CO represents a carbonyl group) replacing a plurality of hydrogen atoms and compounds which are converted into such a form during cross-linking.

Specific examples of the polyamine cross-linking agents include aliphatic polyvalent amines such as hexamethylenediamine, hexamethylenediamine carbamate, N,N-dicinnamylidene-1,6-hexanediamine, tetramethylenepentamine, and hexamethylenediamine cinnamaldehyde adducts; aromatic polyvalent amines such as 4,4-methylenedianiline, m-phenylenediamine, 4,4-diaminodiphenyl ether, 3,4-diaminodiphenyl ether, 4,4-(m-phenylenediisopropylidene)dianiline, 4,4-(p-phenylenediisopropylidene)dianiline, 2,2-bis[4-(4-aminophenoxy)phenyl]propane, 4,4-diaminobenzanilide, 4,4-bis(4-aminophenoxy)biphenyl, m-xylylenediamine, p-xylylenediamine, and 1,3,5-benzenetriamine; polyvalent hydrazides such as isophthalic acid dihydrazide, terephthalic acid dihydrazide, phthalic acid dihydrazide, 2,6-naphthalene dicarboxylic acid dihydrazide, naphthalenic acid dihydrazide, oxalic acid dihydrazide, malonic acid dihydrazide, succinic acid dihydrazide, glutamic acid dihydrazide, adipic acid dihydrazide, pimelic acid dihydrazide, suberic acid dihydrazide, azelaic acid dihydrazide, sebacic acid dihydrazide, brassylic acid dihydrazide, dodecanedioic acid dihydrazide, acetone dicarboxylic acid dihydrazide, fumaric acid dihydrazide, maleic acid dihydrazide, itaconic acid dihydrazide, trimellitic acid dihydrazide, 1,3,5-benzene tricarboxylic acid dihydrazide, aconitic acid dihydrazide, and pyromellitic acid dihydrazide; and the like. Among these, preferred are aliphatic polyvalent amines and aromatic polyvalent amines, more preferred are hexamethylenediamine carbamate and 2,2-bis[4-(4-aminophenoxy)phenyl]propane, and particularly preferred is hexamethylenediamine carbamate to more significantly enhance the effects of the present invention.

Although the cross-linkable rubber composition according to the present invention can contain the cross-linking agent in any amount, the content is preferably 0.1 to 20 parts by weight, more preferably 1 to 15 parts by weight relative to 100 parts by weight of the nitrile group-containing copolymer rubber.

If a polyamine cross-linking agent is used as the cross-linking agent, it is preferred that a basic cross-linking accelerator be further contained.

Specific examples of the basic cross-linking accelerator include compounds represented by General Formula (1), basic cross-linking accelerators having a cyclic amidine structure, basic guanidine cross-linking accelerators, basic aldehyde amine cross-linking accelerators, and the like.

[Chem 1]

(where $R^4$ and $R^2$ each independently represent a $C_1$ to $C_{12}$ alkyl group optionally having a substituent or a $C_5$ to $C_{12}$ cycloalkyl group optionally having a substituent).

$R^4$ and $R^2$ are a $C_1$ to $C_{12}$ alkyl group optionally having a substituent or a $C_5$ to $C_{12}$ cycloalkyl group optionally having a substituent. Preferred is a $C_5$ to $C_{12}$ cycloalkyl group optionally having a substituent, and particularly preferred is a $C_5$ to $C_8$ cycloalkyl group optionally having a substituent.

It is also preferred that $R^4$ and $R^2$ have no substituent.

When $R^4$ and $R^2$ have a substituent, specific examples of the substituent include a hydroxyl group, an alkoxy group, an alkoxycarbonyl group, an amino group, halogen atoms, and the like.

Among these compounds represented by General Formula (1), more preferred are compounds represented by General Formula (2) to further enhance the processability and the scorching stability.

[Chem 2]

$$R^3\text{—NH—}R^4 \qquad (2)$$

(where $R^3$ and $R^4$ each independently represent a $C_5$ to $C_8$ cycloalkyl group optionally having a substituent).

Although $R^3$ and $R^4$ are a $C_5$ to $C_8$ cycloalkyl group optionally having a substituent, preferred are $C_5$ or $C_6$ cycloalkyl groups optionally having a substituent, and more preferred are $C_6$ cycloalkyl groups optionally having a substituent.

It is also preferred that $R^3$ and $R^4$ have no substituent.

When $R^3$ and $R^4$ have a substituent, specific examples of the substituent include a hydroxyl group, an alkoxy group, an alkoxycarbonyl group, an amino group, halogen atoms, and the like.

Specific examples of the compounds represented by General Formula (1) include dicycloalkylamines such as dicyclopentylamine, dicyclohexylamine, and dicycloheptylamine; secondary amines whose nitrogen atom is bonded to an alkyl group and a cycloalkyl group, such as N-methylcyclopentylamine, N-butylcyclopentylamine, N-heptylcyclopentylamine, N-octylcyclopentylamine, N-ethylcyclohexylamine, N-butylcyclohexylamine, N-heptylcyclohexylamine, and N-octylcyclooctylamine; secondary amines whose nitrogen atom is bonded to an alkyl group having a hydroxy group and a cycloalkyl group, such as N-hydroxymethylcyclopentylamine and N-hydroxybutylcyclohexylamine; secondary amines whose nitrogen atom is bonded to an alkyl group having an alkoxy group and a cycloalkyl group, such as N-methoxyethylcyclopentylamine and N-ethoxybutylcyclohexylamine; secondary amines whose nitrogen atom is bonded to an alkyl group having an alkoxycarbonyl group and a cycloalkyl group, such as N-methoxycarbonylbutylcyclopentylamine and N-methoxycarbonylheptylcyclohexylamine; secondary amines whose nitrogen atom is bonded to an alkyl group having an amino group and a cycloalkyl group, such as N-aminopropylcyclopentylamine and N-aminoheptylcyclohexylamine; secondary amines whose nitrogen atom is bonded to cycloalkyl groups having a halogen atom, such as di(2-chlorocyclopentyl)amine and di(3-chlorocyclopentyl)amine; and the like.

To further enhance the processability and the scorching stability, preferred are dicycloalkylamines, more preferred are dicyclopentylamine and dicyclohexylamine, and particularly preferred is dicyclohexylamine.

Examples of the basic cross-linking accelerators having a cyclic amidine structure include 1,8-diazabicyclo[5,4,0]undecene-7 (hereinafter, abbreviated to "DBU" in some cases), 1,5-diazabicyclo[4,3,0]nonene-5 (hereinafter, abbreviated to "DBN" in some cases), 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl)imidazole, 1-methylbenzimidazole, 1-methyl-2-benzylbenzimidazole, 1-methyl-5-nitrobenzimidazole, 1-methylimidazoline, 1,2-dimethylimidazoline, 1,2,4-trimethylimidazoline, 1,4-dimethyl-2-ethylimidazoline, 1-methyl-phenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, 1-ethoxymethyl-2-methylimidazoline, and the like. Among these basic cross-linking accelerators having a cyclic amidine structure, preferred are 1,8-diazabicyclo[5,4,0]undecene-7 and 1,5-diazabicyclo[4,3,0]nonene-5, and more preferred is 1,8-diazabicyclo[5,4,0]undecene-7.

Examples of the guanidine basic cross-linking accelerators include tetramethylguanidine, tetraethyguanidine, diphenylguanidine, 1,3-di-ortho-tolylguanidine, orthotolylbiguanide, and the like.

Examples of the aldehyde amine basic cross-linking accelerators include n-butylaldehyde aniline, acetaldehyde ammonia, and the like.

Among these basic cross-linking accelerators, preferred are the compounds represented by General Formula (1), the basic guanidine cross-linking accelerators, and the basic cross-linking accelerators having a cyclic amidine structure, and more preferred are the compounds represented by General Formula (1) and the basic cross-linking accelerators having a cyclic amidine structure.

The compounds represented by General Formula (1) may be mixed with alcohols such as an alkylene glycol and a $C_5$ to $C_{20}$ alkyl alcohol, and such mixtures may further contain an inorganic acid and/or an organic acid. The compounds represented by General Formula (1) may form (a) salt(s) with the inorganic acid and/or the organic acid, and may further form a composite with the alkylene glycol. The basic cross-linking accelerator having a cyclic amidine structure may form a salt with an organic carboxylic acid, an alkyl phosphoric acid, or the like.

If the basic cross-linking accelerator is compounded, the compounding amount of the basic cross-linking accelerator in the cross-linkable rubber composition according to the present invention is preferably 0.1 to 20 parts by weight, more preferably 0.2 to 15 parts by weight, still more preferably 0.5 to 10 parts by weight relative to 100 parts by weight of the nitrile group-containing copolymer rubber.

Besides the above components, the following compounding agents usually used in the rubber field can also be compounded with the cross-linkable rubber composition according to the present invention: for example, reinforcing agents such as carbon black and silica, fillers such as calcium carbonate, talc, and clay, metal oxides such as zinc oxide and magnesium oxide, α,β-ethylenically unsaturated carboxylic acid metal salts such as zinc methacrylate and zinc acrylate, co-cross-linking agents, cross-linking aids, cross-linking retarders, antiaging agents, antioxidants, light stabilizers, scorching preventing agents such as primary amines, activating agents such as diethylene glycol, coupling agents, plasticizers, processing aids, greases, adhesives, lubricants, flame retardants, antifungal agents, acid acceptors, antistatic agents, pigments, foaming agents, and the like. These compounding agents can be compounded in any compounding amounts according to the purpose of compounding within the ranges not impairing the object and effects of the present invention.

Examples of the coupling agents include silane coupling agents, aluminum coupling agents, titanate coupling agents, and the like. Any silane coupling agent can be used without limitation. Specific examples thereof include sulfur-containing silane coupling agents such as γ-mercaptopropyltrimethoxysilane, γ-mercaptomethyltrimethoxysilane, γ-mercaptomethyltriethoxysilane, γ-mercaptohexamethyldisilazane, bis(3-triethoxysilylpropyl)tetrasulfane, and bis(3-triethoxysilylpropyl)dusulfane; epoxy group-containing silane coupling agents such as γ-glycidoxypropyltrimethoxysilane, γ-glycidoxypropylmethyldimethoxysilane, β-(3,4-epoxycyclohexyl)ethyltrimethoxysilane, γ-mercaptopropyltrimethoxysilane, and γ-glycidoxypropylmethyldiethoxysilane; amino group-containing silane coupling agents such as N-(β-aminoethyl)-γ-aminopropyltrimethoxysilane, γ-aminopropyltrimethoxysilane, γ-aminopropyltriethoxysilane, N-2-(aminoethyl)-3-aminopropyltrimethoxysilane, N-2-(aminoethyl)-3-aminopropyltriethoxysilane, 3-triethoxysilyl-N-(1,3-dimethyl-butylidene)propylamine, and N-phenyl-3-aminopropyltrimethoxysilane; (meth)acryloxy group-containing silane coupling agents such as γ-methacryloxypropyltrimethoxysilane, γ-methacryloxypropyltris(β-methoxyethoxy)silane, γ-methacryloxypropylmethyldimethoxysilane, γ-methacryloxypropylmethyldiethoxysilane, γ-methacryloxypropyltriethoxysilane, and γ-acryloxypropyltrimethoxysilane; vinyl group-containing silane coupling agents such as vinyltrimethoxysilane, vinyltriethoxysilane, vinyltris(β-methoxyethoxy)silane, vinyltrichlorosilane, and vinyltriacetoxysilane; chloropropyl group-containing silane coupling agents such as 3-chloropropyltrimethoxysilane; isocyanate group-containing silane coupling agents such as 3-isocyanatepropyltriethoxysilane; styryl group-containing silane coupling agents such as p-styryltrimethoxysilane; ureido group-containing silane coupling agents such as 3-ureidopropyltriethoxysilane; allyl group-containing silane coupling agents such as diallyldimethylsilane; alkoxy group-containing silane coupling agents such as tetraethoxysilane; phenyl group-containing silane coupling agents such as diphenyldimethoxysilane; fluoro group-containing silane coupling agents such as trifluoropropyltrimethoxysilane; alkyl group-containing silane coupling agents such as isobutyltrimethoxysilane and cyclohexylmethyldimethoxysilane; and the like.

Any aluminum coupling agent can be used without limitation. Specific examples thereof include acetoalkoxyaluminum diisopropylate, and the like.

Any titanate coupling agent can be used without limitation. Specific examples thereof include isopropyltriisostearoyl titanate, isopropyltris(dioctylpyrophosphate) titanate, isopropyltri(N-aminoethyl-aminoethyl) titanate, tetraoctylbis(ditridecylphosphite) titanate, tetra(2,2-diallyloxymethyl-1-butyl)bis(ditridecyl)phosphite titanate, bis(dioctylpyrophosphate)oxyacetate titanate, bis(dioctylpyrophosphate) ethylene titanate, tetraisopropylbis(dioctylphosphite) titanate, isopropyltriisostearoyl titanate, and the like. These silane coupling agents, aluminum coupling agents, titanate coupling agents, and the like can be used alone or in combination.

Examples of carbon black include furnace black, acetylene black, thermal black, channel black, austin black, graphite, and the like. These can be used alone or in combination.

Examples of silica include natural silicas such as quartz powder and silica stone powder; synthetic silicas such as silicic anhydride (such as silica gel and aerosil) and hydrous silicic acid; and the like. Among these, preferred are synthetic silicas. These silicas may be surface-treated with a coupling agent or the like. Examples of coupling agents usable in the surface treatment include those listed above.

Any co-cross-linking agent can be used without limitation. Preferred are low molecular weight or high molecular weight compounds having two or more radically reactive unsaturated groups in the molecule. Examples thereof include polyfunctional vinyl compounds such as divinylbenzene and divinylnaphthalene; isocyanurates such as triallyl isocyanurate and trimethallyl isocyanurate; cyanurates such as triallyl cyanurate; maleimides such as N,N'-m-phenylenedimaleimide; allyl esters of polyvalent acids such as diallyl phthalate, diallyl isophthalate, diallyl maleate, diallyl fumarate, diallyl sebacate, and triallyl phosphate; diethylene glycol bisallyl carbonate; allyl ethers such as ethylene glycol diallyl ether, triallyl ether of trimethylolpropane, and partial allyl ether of pentaerythrite; allyl-modified resins such as allylated novolak and allylated resol resin; tri- to pentafunctional methacrylate compounds and acrylate compounds such as trimethylolpropane trimethacrylate and trimethylolpropane triacrylate; and the like. These can be used alone or in combination.

Any plasticizer can be used without limitation, for example, trimellitic acid plasticizers, pyromellitic acid plasticizers, ether ester plasticizers, polyester plasticizers, phthalic acid plasticizers, adipic acid ester plasticizers, phosphoric acid ester plasticizers, sebacic acid ester plasticizers, alkylsulfonic acid ester compound plasticizers, epoxidated vegetable oil plasticizers, and the like can be used. Specific examples thereof include tri-2-ethylhexyl trimellitate, trimellitic acid isononyl ester, trimellitic acid mixed linear alkyl esters, dipentaerythritol esters, pyromellitic acid 2-ethylhexyl ester, polyether esters (molecular weight: about 300 to 5000), bis[2-(2-butoxyethoxy)ethyl]adipate, dioctyl adipate, adipic acid polyester (molecular weight: about 300 to 5000), dioctyl phthalate, diisononyl phthalate, dibutyl phthalate, tricresyl phosphate, dibutyl sebacate, alkylsulfonic acid phenyl ester, epoxidized soybean oil, diheptanoate, di-2-ethylhexanoate, didecanoate, and the like. These can be used alone or in combination.

Furthermore, in the cross-linkable rubber composition according to the present invention, a rubber other than the nitrile group-containing copolymer rubber according to the present invention described above may be compounded in the range not impairing the effects of the present invention.

Examples of such a rubber include acrylic rubber, ethylene-acrylic acid copolymer rubber, styrene-butadiene copolymer rubber, polybutadiene rubber, ethylene-propylene copolymer rubber, ethylene-propylene-diene ternary copolymer rubber, epichlorohydrin rubber, fluorocarbon rubber, urethane rubber, chloroprene rubber, silicone rubber, natural rubber, polyisoprene rubber, and the like.

If the rubber other than the nitrile group-containing copolymer rubber according to the present invention is compounded, the compounding amount in the cross-linkable rubber composition is preferably 30 parts by weight or less, more preferably 20 parts by weight or less, still more preferably 10 parts by weight or less relative to 100 parts by weight of the nitrile group-containing copolymer rubber according to the present invention.

The cross-linkable rubber composition according to the present invention is prepared by mixing the components above preferably in a nonaqueous system. The cross-linkable rubber composition according to the present invention can be prepared by any method without limitation. The cross-linkable rubber composition can be usually prepared as follows: The components other than the cross-linking agent and thermally unstable components are primarily kneaded with a mixer such as a Banbury mixer, an internal mixer, a kneader, or the like. The kneaded mixture is transferred into an open roll mill or the like. The cross-linking agent and the thermally unstable components are added thereto, and the mixture are secondarily kneaded. The primary kneading is performed usually at a temperature of 10 to 200° C., preferably 30 to 180° C. for 1 minute to 1 hour, preferably 1 minute to 30 minutes. The secondary kneading is performed at a temperature of usually 10 to 90° C., preferably 20 to 60° C. for 1 minute to 1 hour, preferably 1 minute to 30 minutes.

Cross-Linked Rubber

The cross-linked rubber according to the present invention is prepared through cross-linking of the cross-linkable rubber composition according to the present invention described above.

The cross-linked rubber according to the present invention can be prepared as follows: The cross-linkable rubber composition according to the present invention is formed using a forming machine having a desired shape, such as an extruder, an injection molding machine, a compressor, or a roll, is subjected to a cross-linking reaction by heating, and is solidified into a cross-linked product. In this case, the composition may be cross-linked after forming, or may be formed and cross-linked at the same time. The forming temperature is usually 10 to 200° C., preferably 25 to 120° C. The cross-linking temperature is usually 100 to 200° C., preferably 130 to 190° C. The cross-linking time is usually 1 minute to 24 hours, preferably 2 minutes to 1 hour.

The cross-linked product, although cross-linked on its surface, may be insufficiently cross-linked in its inside depending on the shape, the size, and the like. Thus, the cross-linked rubber may be secondarily cross-linked by further heating.

The heating method may be appropriately selected from methods used to cross-link rubber, such as press heating, steam heating, oven heating, and hot air heating.

The cross-linked rubber according to the present invention thus obtained is prepared using the nitrile group-containing copolymer rubber according to the present invention described above, and has high compression set resistance.

For this reason, utilizing such properties, the cross-linked rubber according to the present invention can be used in broad applications: for example, a variety of sealing materials such as O-rings, packings, diaphragms, oil seals, shaft seals, bearing seals, wellhead seals, shock absorber seals, coolant seals as seals for sealing cooling solutions such as long life coolants (LLC), oil coolant seals, seals for pneumatic apparatuses and devices, seals for sealing Freon, fluorohydrocarbons, or carbon dioxide used in cooling apparatuses for air conditioners and compressors for refrigerators of air-conditioning systems, seals for sealing supercritical carbon dioxide or subcritical carbon dioxide used as washing media for precision cleaning, seals for roller devices (such as roller bearings, automotive hub units, automotive water pumps, linear guide devices, and ball screws), valves and valve sheets, blow out preventers (BOPs), and bladders; a variety of gaskets such as an intake manifold gasket attached to a connection between an intake manifold and a cylinder head, a cylinder head gasket attached to a connection between a cylinder block and a cylinder head, a rocker cover gasket attached to a connection between a rocker cover and a cylinder head, an oil pan gasket attached to a connection between an oil pan and a cylinder block or a transmission case, a gasket for fuel cell separators attached between a pair of housings which sandwich a unit cell including a positive electrode, an electrolyte plate, and a negative electrode, and a gasket for top covers for hard disk drives; a variety of rolls such as printing rolls, ironmaking rolls, papermaking rolls, industrial rolls, and office equipment rolls; a variety of belts such as flat belts (such as film core flat belts, cord flat belts, laminated flat belts, and single flat belts), V-belts (such as wrapped V-belts and low edge V-belts), V-ribbed belts (such as single V-ribbed belts, double V-ribbed belts, wrapped V-ribbed belt, rubber-backed V-ribbed belts, and top cog V-ribbed belts), CVT use belts, timing belts, toothed belts, and conveyor belts; a variety of hoses such as fuel hoses, turbo air hoses, oil hoses, radiator hoses, heater hoses, water hoses, vacuum brake hoses, control hoses, air conditioner hoses, brake hoses, power steering hoses, air hoses, marine hoses, risers, and flow lines; a variety of boots such as CVJ boots, propeller shaft boots, constant-velocity joint boots, and rack and pinion boots; damping material rubber parts such as cushion materials, dynamic dampers, rubber couplings, air springs, vibration insulators, and clutch facing materials; dust covers, automotive interior members, friction materials, tires, covered cables, shoe soles, electromagnetic wave shields, adhesives such as adhesives for flexible printed substrates, and fuel cell separators, as well as in the field of electronics.

EXAMPLES

The present invention will now be described more specifically by way of Examples and Comparative Examples. In each example, the term "parts" is weight-based unless otherwise specified. Note that the tests and the evaluations were carried out as follows.

Carboxyl Group Content $C_C$ 100 mL of pyridine was added to 0.2 g of a 2 mm-square nitrile group-containing copolymer rubber, and the mixture was stirred for 16 hours. Under stirring, titration was performed at room temperature using a 0.02 N alcoholic solution of potassium hydroxide and thymolphthalein as an indicator. The carboxyl group content $C_C$ (unit: ephr) was thereby determined as the number of moles of carboxyl groups relative to 100 g of rubber.

Absorbance Area $S_A$ of Carboxylic Anhydride Group by Infrared Spectroscopy

For the absorbance area $S_A$ of a carboxylic anhydride group, infrared spectroscopy was performed on a solid nitrile group-containing copolymer rubber by attenuated total reflection (ATR) method using a Fourier transform infrared spectrophotometer (FT-IR) as an infrared spectrophotometer according to "Analytical general rules for infrared spectroscopy" specified in JIS K 0117:2000. From the results obtained by infrared spectroscopy, the area of the peak of the absorbance which appeared in the range of 1770 to 1790 $cm^{-1}$ was calculated, and was defined as the absorbance area $S_A$ (unit: $cm^{-1}$). If the calculated area of the peak of the absorbance in the range of 1770 to 1790 $cm^{-1}$ was 0.030 or more, the area of the peak of the absorbance in the range extended to 1765 to 1795 $cm^{-1}$ was calculated and was defined as the absorbance area $S_A$.

The Fourier transform infrared spectrophotometer used in the measurement was "FTS7000" made by Agilent Technologies, Inc. using a diamond having an angle of incidence of 45° (Golden Gate 10542 made by Systems Engineering Inc.) as a prism. To minimize the errors of measurement of the absorbance area, the measurement was performed at room temperature while the rubber was pressed against the entire surface of the prism so as to cover the entire surface thereof without any gap. In the measurement, the sample for measurement was a nitrile group-containing copolymer rubber not diluted with any other material (namely, the state where the concentration was 100 wt %). The absorbance area $S_A$ was determined using a standard measurement function included in the Fourier transform infrared spectrophotometer "FTS7000" to measure the absorbance area.

Iodine Value

The iodine value of the nitrile group-containing copolymer rubber was measured in accordance with JIS K 6235.

Composition of Nitrile Group-Containing Copolymer Rubber

The proportions of the monomer units forming the nitrile group-containing copolymer rubber were determined according to the following method.

In other words, the proportions of the mono-n-butyl maleate unit, the mono-n-butyl fumarate unit, the monocyclohexyl fumarate unit, and the mono-n-butyl itaconate unit were calculated as follows: The number of moles of carboxyl groups relative to 100 g of nitrile group-containing copolymer rubber after hydrogenation was determined by the method of measuring the "carboxyl group content" described above, and the determined number of moles thereof was converted into the contents of the mono-n-butyl maleate unit, the mono-n-butyl fumarate unit, the monocyclohexyl fumarate unit, or the mono-n-butyl itaconate unit.

The proportion of the 1,3-butadiene unit (including the hydrogenated moieties) was calculated from the iodine value of the nitrile group-containing copolymer rubber before hydrogenation, which was measured (in accordance with JIS K 6235).

The proportion of the acrylonitrile unit was calculated from the nitrogen content in the nitrile group-containing copolymer rubber after hydrogenation, which was measured in accordance with JIS K 6384 by a semi-micro Kjeldahl method or a modified Dumas method.

The proportions of the n-butyl acrylate unit and the acrylic acid methoxyethyl acrylate unit were calculated as the balance of the monomer units above.

Polymer Mooney Viscosity

The Mooney viscosity (polymer Mooney viscosity) (ML1+4, 100° C.) of the nitrile group-containing copolymer rubber was measured in accordance with JIS K 6300.

Change Amount ΔML of Mooney Viscosity

The Mooney viscosity (compound Mooney viscosity) (ML1+4, 100° C.) of the cross-linkable rubber composition was measured in accordance with JIS K 6300, and the difference from the polymer Mooney viscosity measured as described above was determined from the expression "(change amount ΔML of Mooney viscosity)=(compound Mooney viscosity)−(polymer Mooney viscosity)". The change amount ΔML of the Mooney viscosity was thereby calculated.

State of Compound

The cross-linkable rubber composition was visually observed, and was evaluated for the state of a sheet-shaped compound dough and the crack or fusion failure during preparation of the sample for a compression set test, which will be described later, according to the following criteria:

<State of Compound Dough>

A: The compound dough is smooth and well wound around a roll.

B: Bagging occurs (float or drip from a roll).

C: The compound dough is rough and does not wind around a roll.

<Crack or Fusion Failure>

A: No crack or fusion failure is found at all.

B: Crack or fusion failure occurs in one or more of ten compound doughs.

C: Crack or fusion failure occurs in one or more of five compound doughs.

Compression Set Test

The cross-linkable rubber composition was primarily cross-linked by pressing at a temperature of 170° C. for 25 minutes using a metal mold, yielding a cylindrical cross-linked rubber having a diameter of 29 mm and a height of 12.5 mm. In the next step, the resulting cross-linked rubber was placed into a gear oven, and was secondarily cross-linked at 170° C. for 4 hours, preparing a cylindrical cross-linked rubber. In accordance with JIS K 6262, the resulting cross-linked rubber was then left to stand under a 150° C. environment for 168 hours in the state where the cross-linked rubber was 25% compressed, and then the compression set was measured. A lower value indicates higher compression set resistance.

Production Example 1

Production of Nitrile Group-Containing Copolymer Rubber (n1)

180 parts of deionized water, 25 parts of a sodium dodecylbenzenesulfonate aqueous solution (concentration: 10%), 5 parts of a sodium naphthalenesulfonate formalin condensate (concentration: 10%), 15 parts of acrylonitrile, 39 parts of n-butyl acrylate, 5.5 parts of mono-n-butyl maleate, and 0.75 parts of t-dodecyl mercaptan (molecular weight adjuster) were sequentially placed into a reactor. The gas inside the reactor was purged with nitrogen three times, and 40.5 parts of 1,3-butadiene was placed thereto. The reactor was kept at 10° C., and 0.1 parts of cumene hydroperoxide (polymerization initiator) and a reducing agent, a chelating agent, and a builder in appropriate amounts were placed thereinto. The polymerization reaction was continued under stirring. When the polymerization conversion ratio reached 80%, 4 parts of a 2.5 wt % aqueous solution of 2,2,6,6-tetramethylpiperidine-1-oxyl (polymerization terminator) was added to terminate the polymerization reaction. In the next step, residual monomers were removed at a water temperature of 60° C. to yield a latex of Nitrile group-containing copolymer rubber (X1) (solids content: 25 wt %).

To palladium chloride, sodium chloride in a 2-fold molar equivalent to that of Pd metal in palladium chloride was added to prepare a palladium aqueous solution. Polyvinylpyrrolidone having a weight average molecular weight of 5,000 was then added to the resulting palladium aqueous solution in a 5-fold amount to that of the Pd metal in palladium chloride in terms of weight ratio, and a potassium hydroxide aqueous solution was further added to prepare a catalyst aqueous solution (pH=12.0). The obtained latex of Nitrile group-containing copolymer rubber (X1) and the catalyst aqueous solution were added in an autoclave such that the palladium content relative to the dry weight of the rubber contained in the latex of Nitrile group-containing copolymer rubber (X1) was 2,500 ppm by weight. A hydrogenating reaction was performed for 6 hours under the following conditions to prepare a latex of Nitrile group-containing copolymer rubber (n1) hydrogenated: hydrogen pressure 3 MPa, temperature 50° C., and solids content 20 wt %. In the next step, the pH of the resulting latex was adjusted to 7.0. A mixed aqueous solution of dimethylglyoxime in a 5-fold molar amount of that of the Pd metal contained in palladium chloride used in the hydrogenating reaction and potassium hydroxide in a 2-fold molar amount of that of dimethylglyoxime was added, and a hydrogen peroxide solution in a 30-fold molar amount of that of the Pd metal was further added. After the mixed solution was heated to 80° C. and was stirred for 5 hours, an insoluble complex was precipitated in the latex. The insoluble complex was removed through filtration. Further, 0.1 parts of 4,6-bis(octylthiomethyl)-o-cresol (Irganox 1520L, made by BASF SE Japan Ltd., antioxidant) and 0.3 parts of ACTICIDE MBS (made by Thor Japan Limited, preservative agent) were added relative to 100 parts of the copolymer rubber in the latex.

The resulting latex of Nitrile group-containing copolymer rubber (n1) was adjusted with 1 wt % sulfuric acid to have a pH of 4. Under stirring, the latex was coagulated by adding the latex to 3-fold volume of deionized water where 100 parts of dietary salt is added relative to 100 parts of the copolymer and the pH is adjusted to 3 with sulfuric acid. The resulting hydrous crumbs of Nitrile group-containing copolymer rubber (n1) were washed with water two times with 1 L deionized water, and were subjected to centrifugal dehydration and then hot air drying at 80° C. for 4 hours to yield Nitrile group-containing copolymer rubber (n1).

The obtained Nitrile group-containing copolymer rubber (n1) had an iodine value of 11 and a polymer Mooney viscosity (ML1+4, 100° C.) of 45. The obtained Nitrile group-containing copolymer rubber (n1) also had the monomer composition, the carboxyl group content $C_C$, the absorbance area $S_A$ of the carboxylic anhydride group, and the processability index $I_{pro}$ ($I_{pro}=C_C \times S_A$) shown in Table 1.

Production Examples 2, 4, 5, 6, 9, and 13

Production of Nitrile Group-Containing Copolymer Rubbers (n2), (n4), (n5), (n6), (n9), and (n13)

Solid Nitrile group-containing copolymer rubbers (n2), (n4), (n5), (n6), (n9), and (n13) were prepared in the same manner as in Production Example 1 except that the types and compounding amounts of the monomers used in polymerization were varied as shown in Table 1 and the polymerization conversion ratio of the polymerization reaction and the amount of the palladium catalyst used in the hydrogenating reaction were varied as shown in Table 1. Nitrile group-containing copolymer rubbers (n2), (n4), (n5), (n6), (n9), and (n13) each had the iodine value, the polymer Mooney viscosity (ML1+4, 100° C.), the monomer composition, the carboxyl group content $C_C$, the absorbance area $S_A$ of the carboxylic anhydride group, and the processability index $I_{pro}$ ($I_{pro}=C_C \times S_A$) shown in Table 1.

Production Examples 3, 7, and 8

Production of Nitrile Group-Containing Copolymer Rubbers (n3), (n7), and (n8)

Solid Nitrile group-containing copolymer rubbers (n3), (n7), and (n8) were prepared in the same manner as in Production Example 1 except that the types and compounding amounts of the monomers used in polymerization were varied as shown in Table 1, the polymerization conversion ratio of the polymerization reaction and the amount of the palladium catalyst used in the hydrogenating reaction were varied as shown in Table 1, and the resulting hydrous crumbs were dried by kneading the hydrous crumbs with a Brabender at 150° C. for 5 minutes. Nitrile group-containing copolymer rubbers (n3), (n7), and (n8) each had the iodine value, the polymer Mooney viscosity (ML1+4, 100° C.), the monomer composition, the carboxyl group content $C_C$, the absorbance area $S_A$ of the carboxylic anhydride group, and the processability index $I_{pro}$ ($I_{pro}=C_C \times S_A$) shown in Table 1.

Production Example 10

Production of Nitrile Group-Containing Copolymer Rubber (n10)

Solid Nitrile group-containing copolymer rubber (n10) was prepared in the same manner as in Production Example 8 except that the drying condition for kneading using a Brabender was changed to 150° C. for 10 minutes. Nitrile group-containing copolymer rubber (n10) had the iodine value, the polymer Mooney viscosity (ML1+4, 100° C.), the monomer composition, the carboxyl group content $C_C$, the absorbance area $S_A$ of the carboxylic anhydride group, and the processability index $I_{pro}$ ($I_{pro}=C_C \times S_A$) shown in Table 1.

Production Example 11

Production of Nitrile Group-Containing Copolymer Rubber (n11)

Solid Nitrile group-containing copolymer rubber (n11) was prepared in the same manner as in Production Example 8 except that the drying condition for kneading using a Brabender was changed to 150° C. for 20 minutes. Nitrile group-containing copolymer rubber (n11) had the iodine value, the polymer Mooney viscosity (ML1+4, 100° C.), the monomer composition, the carboxyl group content $C_C$, the absorbance area $S_A$ of the carboxylic anhydride group, and the processability index $I_{pro}$ ($I_{pro}=C_C \times S_A$) shown in Table 1.

Production Example 12

Production of Nitrile Group-Containing Copolymer Rubber (n12)

Solid Nitrile group-containing copolymer rubber (n12) was prepared in the same manner as in Production Example 8 except that the drying condition for kneading using a Brabender was changed to 180° C. for 5 minutes. Nitrile group-containing copolymer rubber (n12) had the iodine value, the polymer Mooney viscosity (ML1+4, 100° C.), the monomer composition, the carboxyl group content $C_C$, the absorbance area $S_A$ of the carboxylic anhydride group, and the processability index $I_{pro}$ ($I_{pro}=C_C \times S_A$) shown in Table 1.

Example 1

Using a Banbury mixer, 40 parts of FEF carbon (trade name "SEAST SO", made by Tokai Carbon Co., Ltd., carbon black), 5 parts of tri-2-ethylhexyl trimellitate (trade name "ADEKA CIZER C-8", made by ADEKA Corporation, plasticizer), 1 part of stearic acid, 1 part of a polyoxyethylene alkyl ether phosphoric acid ester (trade name "Phosphanol RL210", made by Toho Chemical Industry, Co., Ltd., processing aid), and 1.5 parts of 4,4'-di-(α,α'- dimethylbenzyl)diphenylamine (trade name "NOCRAC CD", made by Ouchi Shinko Chemical Industrial Co., Ltd., antioxidant) were added to and kneaded with 100 parts of Nitrile group-containing copolymer rubber (n1) prepared in Production Example 1. In the next step, the mixture was placed into a roll, and 4 parts of 1,8-diazabicyclo[5,4,0]undecene-7 (DBU) (trade name: "RHENOGRAN XLA-60 (GE2014)", made by Rhein Chemie Corporation, a product composed of 60 wt % of DBU (including a fraction which is zinc dialkyldiphosphate salt), and an acrylic acid polymer and a dispersant (40 wt % in total), basic cross-linking accelerator), and 2 parts of hexamethylenediamine carbamate (trade name "Diak #1", made by E. I. du Pont de Nemours and Company, polyamine cross-linking agent belonging to aliphatic polyvalent amines) were added to and kneaded with the mixture to prepare a sheet-shaped cross-linkable rubber composition.

Using the resulting sheet-shaped cross-linkable rubber composition, the measurement of the change amount ΔML of Mooney viscosity, the evaluation of the compound state, and the compression set test were performed by the methods described above. The results are shown in Table 2.

Examples 2 to 10

Cross-linkable rubber compositions were prepared in the same manner as in Example 1 except that Nitrile group-containing copolymer rubbers (n2) to (n10) prepared in Production Examples 2 to 10 were used instead of Nitrile group-containing copolymer rubber (n1) prepared in Production Example 1 and the compounding amount of hexamethylenediamine carbamate as the cross-linking agent was varied as shown in Table 2, and were evaluated in the same manner as in Example 1. The results are shown in Table 2.

Comparative Examples 1, 2, and 3

Cross-linkable rubber compositions were prepared in the same manner as in Example 1 except that Nitrile group-containing copolymer rubbers (n11), (n12), and (n13) prepared in Production Examples 11, 12, and 13 were used instead of Nitrile group-containing copolymer rubber (n1) prepared in Production Example 1 and the compounding amount of hexamethylenediamine carbamate as the cross-linking agent was varied as shown in Table 2, and were evaluated in the same manner as in Example 1. The results are shown in Table 2.

TABLE 1

| | | Production Example | | | | | | |
|---|---|---|---|---|---|---|---|---|
| | | 1 | 2 | 3 | 4 | 5 | 6 | 7 |
| Type of nitrile group-containing copolymer rubber | | (n1) | (n2) | (n3) | (n4) | (n5) | (n6) | (n7) |
| Monomers used in polymerization | | | | | | | | |
| Acrylonitrile | (parts) | 15 | 15 | 20 | 20 | 20 | 43 | 23 |
| 1,3-Butadiene | (parts) | 40.5 | 40.5 | 39 | 39 | 39 | 51.5 | 38.5 |
| Methoxyethyl acrylate | (parts) | | | | | | | 33 |
| n-Butyl acrylate | (parts) | 39 | 39 | 35.5 | 34.5 | 35.5 | | |
| Mono-n-butyl maleate | (parts) | 5.5 | 5.5 | 5.5 | | | 5.5 | 5.5 |
| Mono-n-butyl fumarate | (parts) | | | | 6.5 | | | |
| Monocyclohexyl fumarate | (parts) | | | | | 5.5 | | |
| Mono-n-butyl itaconate | (parts) | | | | | | | |
| Polymerization conversion ratio | (%) | 80 | 80 | 80 | 80 | 80 | 80 | 80 |
| Amount of palladium catalyst used in hydrogenation | (ppm by weight) | 2500 | 1000 | 2500 | 1200 | 1750 | 2500 | 2500 |
| Drying condition | | | | | | | | |
| Hot air drying | | 80° C 4 hours | 80° C 4 hours | | 80° C 4 hours | 80° C 4 hours | 80° C 4 hours | |
| Kneading drying | | | | 150° C. 5 min | | | | 150° C. 5 min |
| Monomer composition of nitrile group-containing copolymer rubber | | | | | | | | |
| Acrylonitrile unit | (wt %) | 15 | 16 | 21 | 21 | 21 | 44 | 24 |
| 1,3-Butadiene unit (including saturated moiety) | (wt %) | 46 | 45 | 43 | 42.5 | 42 | 51 | 47 |
| Methoxyethyl acrylate unit | (wt %) | | | | | | | 24 |
| n-Butyl acrylate unit | (wt %) | 34 | 34 | 31 | 30 | 31 | | |
| Mono-n-butyl maleate unit | (wt %) | 5 | 5 | 5 | | | 5 | 5 |
| Mono-n-butyl fumarate unit | (wt %) | | | | 6.5 | | | |
| Monocyclohexyl fumarate unit | (wt %) | | | | | 6 | | |
| Mono-n-butyl itaconate unit | (wt %) | | | | | | | |
| Iodine value of nitrile group-containing copolymer rubber | | 11 | 60 | 11 | 50 | 20 | 10 | 8 |
| Polymer Mooney viscosity (ML1 + 4,100° C.) | | 45 | 40 | 50 | 40 | 45 | 40 | 55 |

TABLE 1-continued

| | | Production Example | | | | | | |
|---|---|---|---|---|---|---|---|---|
| Carboxyl group content $C_C$ | (ephr) | 0.029 | 0.029 | 0.028 | 0.038 | 0.03 | 0.029 | 0.03 |
| Absorbance area $S_A$ of carboxylic anhydride group | | N.D. | 0.015 | 0.019 | N.D. | N.D. | 0.051 | 0.062 |
| Processability index $1_{pro}$ ($1_{pro} = C_C \times S_A$) | | 0 | 0.0004 | 0.0005 | 0 | 0 | 0.0015 | 0.0019 |

| | | 8 | 9 | 10 | 11 | 12 | 13 |
|---|---|---|---|---|---|---|---|
| Type of nitrile group-containing copolymer rubber | | (n8) | (n9) | (n10) | (n11) | (n12) | (n13) |
| Monomers used in polymerization | | | | | | | |
| Acrylonitrile | (parts) | 35 | 35 | 35 | 35 | 35 | 32 |
| 1,3-Butadiene | (parts) | 59 | 59.5 | 59 | 59 | 59 | 56 |
| Methoxyethyl acrylate | (parts) | | | | | | |
| n-Butyl acrylate | (parts) | | | | | | |
| Mono-n-butyl maleate | (parts) | 6 | | 6 | 6 | 6 | 12 |
| Mono-n-butyl fumarate | (parts) | | | | | | |
| Monocyclohexyl fumarate | (parts) | | | | | | |
| Mono-n-butyl itaconate | (parts) | | 5.5 | | | | |
| Polymerization conversion ratio | (%) | 80 | 80 | 80 | 80 | 80 | 80 |
| Amount of palladium catalyst used in hydrogenation | (ppm by weight) | 2500 | 2500 | 2500 | 2500 | 2500 | 2500 |
| Drying condition | | | | | | | |
| Hot air drying | | | 80° C 4 hours | | | | 80° C 4 hours |
| Kneading drying | | 150° C. 5 min | | 150° C. 10 min | 150° C. 20 min | 180° C. 5 min | |
| Monomer composition of nitrile group-containing copolymer rubber | | | | | | | |
| Acrylonitrile unit | (wt %) | 36 | 36 | 36 | 36 | 36 | 33 |
| 1,3-Butadiene unit (including saturated moiety) | (wt %) | 58 | 59 | 58 | 58 | 58 | 55 |
| Methoxyethyl acrylate unit | (wt %) | | | | | | |
| n-Butyl acrylate unit | (wt %) | | | | | | |
| Mono-n-butyl maleate unit | (wt %) | 6 | | 6 | 6 | 6 | 12 |
| Mono-n-butyl fumarate unit | (wt %) | | | | | | |
| Monocyclohexyl fumarate unit | (wt %) | | | | | | |
| Mono-n-butyl itaconate unit | (wt %) | | 5 | | | | |
| Iodine value of nitrile group-containing copolymer rubber | | 9 | 9 | 9 | 9 | 9 | 15 |
| Polymer Mooney viscosity (ML1 + 4,100° C.) | | 50 | 45 | 50 | 50 | 50 | 50 |
| Carboxyl group content $C_C$ | (ephr) | 0.035 | 0.028 | 0.035 | 0.035 | 0.035 | 0.07 |
| Absorbance area $S_A$ of carboxylic anhydride group | | 0.059 | 0.042 | 0.076 | 0.095 | 0.115 | 0.044 |
| Processability index $1_{pro}$ ($1_{pro} = C_C \times S_A$) | | 0.0021 | 0.0012 | 0.0027 | 0.0033 | 0.004 | 0.0031 |

TABLE 2

| | | Example | | | | | | |
|---|---|---|---|---|---|---|---|---|
| | | 1 | 2 | 3 | 4 | 5 | 6 | 7 |
| Type of nitrile group-containing copolymer rubber | | (n1) | (n2) | (n3) | (n4) | (n5) | (n6) | (n7) |
| Monomer composition of nitrile group-containing copolymer rubber | | | | | | | | |
| Acrylonitrile unit | (wt %) | 15 | 16 | 21 | 21 | 21 | 44 | 24 |
| 1,3-Butadiene unit (including saturated moiety) | (wt %) | 46 | 45 | 43 | 42.5 | 42 | 51 | 45 |
| Methoxyethyl acrylate unit | (wt %) | | | | | | | 26 |
| n-Butyl acrylate unit | (wt %) | 34 | 34 | 31 | 30 | 31 | | |
| Mono-n-butyl maleate unit | (wt %) | 5 | 5 | 5 | | | 5 | 5 |
| Mono-n-butyl fumarate unit | (wt %) | | | | 6.5 | | | |
| Monocyclohexyl fumarate unit | (wt %) | | | | | 6 | | |
| Mono-n-butyl itaconate unit | (wt %) | | | | | | | |
| Iodine value of nitrile group-containing copolymer rubber | | 11 | 60 | 11 | 50 | 20 | 10 | 8 |

TABLE 2-continued

|  |  | | | | | | | |
|---|---|---|---|---|---|---|---|---|
| Carboxyl group content $C_C$ | (ephr) | 0.029 | 0.029 | 0.028 | 0.038 | 0.03 | 0.029 | 0.03 |
| Absorbance area $S_A$ of carboxylic anhydride group |  | N.D. | 0.015 | 0.019 | N.D. | N.D. | 0.051 | 0.062 |
| Processability index $I_{pro}$ ($I_{pro} = C_C \times S_A$) |  | 0 | 0.0004 | 0.0005 | 0 | 0 | 0.0015 | 0.0019 |
| Formulation of cross-linkable rubber composition |  | | | | | | | |
| Compounding amount of hexamethylenediamine carbamate | (parts) | 2.0 | 2.0 | 1.9 | 2.6 | 2.1 | 2.0 | 2.1 |
| Evaluation of cross-linkable rubber composition |  | | | | | | | |
| Change amount of Mooney viscosity ΔML |  | 17 | 19 | 22 | 25 | 18 | 34 | 38 |
| State of compound dough |  | A | A | A | A | A | A | A |
| Crack/Fusion failure |  | A | A | A | A | A | A | A |
| Evaluation of cross-linked rubber |  | | | | | | | |
| Compression set | (%) | 16 | 18 | 17 | 16 | 19 | 18 | 15 |

|  |  | Example | | | Comparative Example | | |
|---|---|---|---|---|---|---|---|
|  |  | 8 | 9 | 10 | 1 | 2 | 3 |
| Type of nitrile group-containing copolymer rubber |  | (n8) | (n9) | (n10) | (n11) | (n12) | (n13) |
| Monomer composition of nitrile group-containing copolymer rubber |  | | | | | | |
| Acrylonitrile unit | (wt %) | 36 | 36 | 36 | 36 | 36 | 33 |
| 1,3-Butadiene unit (including saturated moiety) |  | 58 | 59 | 58 | 58 | 58 | 55 |
| Methoxyethyl acrylate unit | (wt %) | | | | | | |
| n-Butyl acrylate unit | (wt %) | | | | | | |
| Mono-n-butyl maleate unit | (wt %) | 6 | | 6 | 6 | 6 | 12 |
| Mono-n-butyl fumarate unit | (wt %) | | | | | | |
| Monocyclohexyl fumarate unit | (wt %) | | | | | | |
| Mono-n-butyl itaconate unit | (wt %) | | 5 | | | | |
| Iodine value of nitrile group-containing copolymer rubber |  | 9 | 9 | 9 | 9 | 9 | 15 |
| Carboxyl group content $C_C$ | (ephr) | 0.035 | 0.028 | 0.035 | 0.035 | 0.035 | 0.07 |
| Absorbance area $S_A$ of carboxylic anhydride group |  | 0.059 | 0.042 | 0.076 | 0.095 | 0.115 | 0.044 |
| Processability index $I_{pro}$ ($I_{pro} = C_C \times S_A$) |  | 0.0021 | 0.0012 | 0.0027 | 0.0033 | 0.004 | 0.0031 |
| Formulation of cross-linkable rubber composition |  | | | | | | |
| Compounding amount of hexamethylenediamine carbamate | (parts) | 2.4 | 1.9 | 2.4 | 2.4 | 2.4 | 4.8 |
| Evaluation of cross-linkable rubber composition |  | | | | | | |
| Change amount of Mooney viscosity ΔML |  | 48 | 30 | 56 | 62 | 65 | 78 |
| State of compound dough |  | A | A | B | C | C | C |
| Crack/Fusion failure |  | A | A | A | B | C | C |
| Evaluation of cross-linked rubber |  | | | | | | |
| Compression set | (%) | 12 | 23 | 12 | 13 | 13 | — |

In Tables 1 and 2, "N. D." under "Absorbance area $S_A$ of carboxylic anhydride group" indicates that the peak derived from the carboxylic anhydride group was not detected in the range of 1770 to 1790 cm$^{-1}$ by visual observation or automatic peak detection function. In this case, the processability index $I_{pro}$ ($I_{pro}=C_C \times S_A$) was calculated where the absorbance area $S_A$ of the carboxylic anhydride group was 0.

In Table 2, the compounding amount of hexamethylenediamine carbamate is expressed as the content relative to 100 parts of the nitrile group-containing copolymer rubber.

In the nitrile group-containing copolymer rubbers comprising 15 to 60 wt % of the α,β-ethylenically unsaturated nitrile monomer unit and 1 to 60 wt % of the α,β-ethylenically unsaturated dicarboxylic acid monoester monomer unit and having an iodine value of 120 or less and a processability index $I_{pro}$ ($I_{pro}=C_C \times S_A$) of 0.0030 or less, their cross-linkable rubber compositions compounded with the cross-linking agent had a small change amount ΔML of the Mooney viscosity, had a favorable state of the compound dough, allowed appropriate prevention of crack or fusion failure in their compounds, and had high forming properties. Moreover, the cross-linked rubbers prepared using such nitrile group-containing copolymer rubbers had a reduced compression set and high compression set resistance (Examples 1 to 10).

In contrast, in the nitrile group-containing copolymer rubbers having a processability index $I_{pro}$ ($I_{pro}=C_C \times S_A$) of more than 0.0030, their cross-linkable rubber compositions compounded with the cross-linking agent had a large change amount ΔML of the Mooney viscosity, had a poor state of the compound dough, caused the crack or fusion failure in their compounds, and had inferior forming properties (Comparative Examples 1, 2, and 3). In particular, for Comparative Example 3, a sample endurable to the compression set test was not obtained. The spectrum of obtained by infrared spectroscopy of the nitrile group-containing copolymer rubber in Production Example 11 is shown in FIG. 1.

The invention claimed is:

1. A method for production of a nitrile group-containing copolymer rubber comprising 10 to 60 wt % of an α,β-ethylenically unsaturated nitrile monomer unit and 1 to 60 wt % of an α,β-ethylenically unsaturated dicarboxylic acid monoester monomer unit, and having an iodine value of 120 or less, wherein a processability index $I_{pro}$ ($I_{pro}=C_C \times S_A$) of the nitrile group-containing copolymer rubber is 0.0030 or less, where the processability index $I_{pro}$ is the product of the carboxyl group content $C_C$, which is the number of moles of carboxyl groups per 100 g of nitrile group-containing copolymer rubber, and the absorbance area $S_A$ of a carboxylic anhydride group determined by infrared spectroscopy, the method comprises a step of obtaining a copolymer by copolymerizing a monomer mixture, a step of hydrogenating the obtained copolymer so as to obtain a hydride of the copolymer, and a step of hot air drying or kneading drying the hydride, and a condition of the hot air drying is 40 to 100° C. for 0.5 to 12 hours, and a condition of the kneading drying is 100 to 170° C. for 1 to 15 minutes.

2. The method for production of a nitrile group-containing copolymer rubber according to claim 1, wherein the hydride is obtained by coagulation by salting-out of the copolymer after hydrogenation.

3. The method for production of a nitrile group-containing copolymer rubber according to claim 1, wherein the processability index $I_{pro}$ ($I_{pro}=C_C \times S_A$) of the nitrile group-containing copolymer rubber is 0.0025 or less.

4. The method for production of a nitrile group-containing copolymer rubber according to claim 1, wherein the processability index $I_{pro}$ ($I_{pro}=C_C \times S_A$) of the nitrile group-containing copolymer rubber is 0.0020 or less.

5. The method for production of a nitrile group-containing copolymer rubber according to claim 1, wherein the step of drying the hydride is carried out by hot air drying the hydride.

6. The method for production of a nitrile group-containing copolymer rubber according to claim 1, wherein the step of drying the hydride is carried out by kneading drying the hydride.

7. The method for production of a nitrile group-containing copolymer rubber according to claim 5, wherein the condition of the hot air drying is 60 to 90° C. for 1 to 6 hours.

8. The method for production of a nitrile group-containing copolymer rubber according to claim 6, wherein the condition of the kneading drying is 120 to 170° C. for 2 to 15 minutes.

* * * * *